United States Patent
Zhou et al.

(10) Patent No.: US 11,452,036 B2
(45) Date of Patent: Sep. 20, 2022

(54) INDICATION INFORMATION SENDING METHOD, INDICATION INFORMATION RECEIVING METHOD, AND DEVICE

(71) Applicant: Huawei Technologies Co., Ltd., Shenzhen (CN)

(72) Inventors: Xun Zhou, Shenzhen (CN); Meilu Lin, Shenzhen (CN); Jian Yu, Shenzhen (CN); Xiao Han, Shenzhen (CN); Yunbo Li, Shenzhen (CN); Ming Gan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 162 days.

(21) Appl. No.: 16/397,711

(22) Filed: Apr. 29, 2019

(65) Prior Publication Data
US 2019/0261268 A1 Aug. 22, 2019

Related U.S. Application Data

(63) Continuation of application No. PCT/CN2017/108276, filed on Oct. 30, 2017.

(30) Foreign Application Priority Data

Oct. 31, 2016 (CN) .......................... 201610928475.6

(51) Int. Cl.
*H04W 52/02* (2009.01)
*H04L 1/00* (2006.01)
(Continued)

(52) U.S. Cl.
CPC ....... *H04W 52/0206* (2013.01); *H04L 1/0026* (2013.01); *H04L 5/00* (2013.01);
(Continued)

(58) Field of Classification Search
CPC . H04W 52/0203; H04W 24/10; H04W 36/00; H04W 36/26; H04W 52/02;
(Continued)

(56) References Cited

U.S. PATENT DOCUMENTS 8,811,247 B2 * 8/2014 Thomson .......... H04W 52/0235
370/311
2009/0067374 A1 3/2009 Yoon et al.
(Continued)

FOREIGN PATENT DOCUMENTS

CN 101043733 A 9/2007
CN 101772089 A 7/2010
(Continued)

OTHER PUBLICATIONS

Park, Minyoung et al., "Proposal for Wake-Up Receiver (WUR) Study Group", IEEE802.11-16/0722r1, May 2016, 14 pages, XP055563380.

*Primary Examiner* — Ian N Moore
*Assistant Examiner* — Latresa A McCallum
(74) *Attorney, Agent, or Firm* — Slater Matsil, LLP

(57) ABSTRACT

A first station generates indication information of any one of an operating channel, an operating band, or an operating channel and an operating band of a wake-up receiver in a second station. The first station sends the indication information, so that the wake-up receiver in the second station works on the indicated operating channel or the indicated
(Continued)

operating band. The first station controls the operating channel or the operating band of the wake-up receiver in the second station by generating the indication information.

20 Claims, 4 Drawing Sheets

(51) Int. Cl.
*H04W 24/10* (2009.01)
*H04W 72/04* (2009.01)
*H04W 36/26* (2009.01)
*H04L 5/00* (2006.01)
*H04W 36/00* (2009.01)

(52) U.S. Cl.
CPC ............ *H04W 24/10* (2013.01); *H04W 36/00* (2013.01); *H04W 36/26* (2013.01); *H04W 52/02* (2013.01); *H04W 52/0235* (2013.01); *H04W 72/0453* (2013.01); *Y02D 30/70* (2020.08)

(58) Field of Classification Search
CPC ......... H04W 52/0235; H04W 72/0453; H04W 72/00; H04W 8/005; H04W 24/02; H04W 36/0083; H04W 72/08; H04W 72/005; H04W 48/08; H04W 48/20; H04W 28/18; H04L 1/0026; H04L 5/00; H04L 12/00; H04L 27/26; Y02D 30/70; H04B 17/24; H04B 1/69; H04B 1/713; H04B 3/20; H04B 7/0697; H04J 3/00; H04J 11/00; H04J 13/00; H04J 13/16
See application file for complete search history.

(56) References Cited

U.S. PATENT DOCUMENTS

| | | | |
|---|---|---|---|
| 2011/0074552 A1 | 3/2011 | Norair et al. | |
| 2011/0317600 A1* | 12/2011 | Thomson | H04B 1/005 370/311 |
| 2012/0069893 A1* | 3/2012 | Shirakata | H04L 25/0262 375/239 |
| 2014/0003314 A1 | 1/2014 | Shu et al. | |
| 2014/0112224 A1* | 4/2014 | Jafarian | H04W 52/0209 370/311 |
| 2015/0327169 A1* | 11/2015 | Nigam | H04W 52/0209 370/311 |
| 2015/0334612 A1* | 11/2015 | Ray Chaudhuri | H04W 36/20 455/437 |
| 2016/0227544 A1* | 8/2016 | Katar | H04W 72/0453 |
| 2016/0262051 A1* | 9/2016 | Merlin | H04W 72/0413 |
| 2017/0223630 A1 | 8/2017 | Thomson et al. | |
| 2018/0092042 A1* | 3/2018 | Xu | H04W 52/0229 |
| 2018/0092117 A1* | 3/2018 | Azizi | H04W 74/006 |

FOREIGN PATENT DOCUMENTS

| | | |
|---|---|---|
| CN | 102300293 A | 12/2011 |
| CN | 102725779 A | 10/2012 |
| CN | 103517419 A | 1/2014 |
| EP | 2400799 A2 | 12/2011 |
| WO | 2007067831 A1 | 6/2007 |
| WO | 2014138131 A1 | 9/2014 |
| WO | 2018034452 A1 | 2/2018 |

* cited by examiner

INDICATION INFORMATION SENDING METHOD, INDICATION INFORMATION RECEIVING METHOD, AND DEVICE

CROSS-REFERENCE TO RELATED APPLICATIONS

This application is a continuation of International Application No. PCT/CN2017/108276, filed on Oct. 30, 2017, which claims priority to Chinese Patent Application No. 201610928475.6, filed on Oct. 31, 2016. The disclosures of the aforementioned applications are hereby incorporated by reference in their entireties.

TECHNICAL FIELD

The present invention relates to the communications field, and in particular, to an indication information sending method, an indication information receiving method, and a device.

BACKGROUND

In a Wi-Fi network, a considerable portion of energy of a station device is consumed on listening (idle listening) and receiving of radio signals. To reduce energy consumption during listening, a sleep policy is configured for the device. When a device, for example, a workstation or a STA (station, station), is not receiving or sending any message, the device may enter deep sleep, so as to reduce energy consumption of continuous channel listening (idle listening). However, when the station is in deep sleep, an AP (Wireless Access Point, wireless access point) cannot communicate with the station, and the two remain unable to communicate with each other until the station wakes up. This causes a latency.

To reduce a high latency caused by a sleep mechanism, the station usually wakes up according to a sleep policy, for example, wake up at a regular time interval to check whether there is data to receive. However, this interval-based data checking manner also reduces sleep efficiency of the station. In view of this, a feasible technical approach is to use a low-power wake-up receiver (LP-WUR). As shown in FIG. 1, the LP-WUR listens to information such as a wake-up packet sent to the station, and wakes up a main radio module of the station when the wake-up packet is received. Then the LP-WUR enters a sleep mode. After completing communication with another station device, the main radio module instructs the LP-WUR to wake up, to continue listening.

To further reduce power consumption and costs of the wake-up receiver, a narrow band is usually used for receipt of wake-up packets. For example, when a basic bandwidth of the main radio module is 20 MHz, a bandwidth allowed for receipt of a wake-up packet is expected to be less than or equal to 5 MHz, for example, 2 MHz or 4 MHz. However, because a radio channel is time-variant and is characterized by fading, a signal may suffer deep fading (deep fading) on a narrowband channel. If deep fading occurs on a narrowband channel on which a wake-up packet is received, a very weak signal is to be received, and even the signal cannot be normally received.

To avoid that a wake-up packet cannot be normally received due to deep fading on a narrow band, the wake-up receiver usually employs a channel rotation mode for the receipt, that is, receives wake-up packets on different narrow bands. However, if this periodic rotation mode is used for receipt on the narrow bands, frequent switching is to occur between operating channels or operating bands. This increases workload of the wake-up receiver, and further increases power consumption of the wake-up receiver.

SUMMARY

This application provides an indication information sending method, an indication information receiving method, and a device, to resolve increased power consumption of a wake-up receiver caused by frequent switching between operating channels. To resolve the foregoing technical problem, this application discloses the following technical solutions.

According to a first aspect, this application provides an indication information sending method. The method includes: generating, by a first station, indication information of any one of an operating channel, an operating band, or an operating channel and an operating band of a wake-up receiver in a second station; and sending, by the first station, the indication information, so that the wake-up receiver in the second station works on the indicated operating channel or the indicated operating band.

According to the method provided in this aspect, the first station generates the indication information used to indicate the operating channel or the operating band of the wake-up receiver in the second station, and sends the indication information to the second station, so that the second station can control the wake-up receiver in the second station to work on the operating channel or the operating band indicated by the indication information. This avoids frequent switching of the wake-up receiver between operating channels or operating bands, and reduces power consumption of the wake-up receiver.

According to a second aspect, an indication information receiving method is provided, applied to a station equipped with a wake-up receiver. The method includes: receiving indication information, where the indication information is used to indicate any one of an operating channel, an operating band, or an operating channel and an operating band of the wake-up receiver; and changing an operating channel or an operating band of the wake-up receiver according to content of the indication information, so that the wake-up receiver works on the indicated operating channel or the indicated operating band.

According to a third aspect, this application provides an information sending method, used to indicate an operating channel or an operating band of a wake-up receiver in a station. The method includes: obtaining indication information of an operating channel, an operating band, or an operating channel and an operating band that the wake-up receiver needs to change to; and changing an operating channel or an operating band of the wake-up receiver according to the indication information, and sending afterchange feedback information of the wake-up receiver.

According to a fourth aspect, this application provides a first station, including: a processor, configured to generate indication information of any one of an operating channel, an operating band, or an operating channel and an operating band of a wake-up receiver in a second station; and a transceiver, configured to send the indication information, so that the wake-up receiver in the second station works on the indicated operating channel or the indicated operating band.

According to a fifth aspect, this application further provides a second station, where the second station includes a wake-up receiver, and the wake-up receiver includes: a transceiver, configured to receive indication information, where the indication information includes content indicating an operating channel or an operating band of the wake-up receiver; and a processor, configured to change an operating channel or an operating band of the wake-up receiver according to the content of the indication information, so that the wake-up receiver works on the indicated operating channel or the indicated operating band. In addition, the transceiver is further configured to obtain a request message for providing channel information, and send measured channel information according to the request message.

According to a sixth aspect, this application further provides another second station, where the second station includes a main radio module and a wake-up receiver, the main radio module is configured to receive indication information, and forward the indication information to the wake-up receiver, where the indication information is used to indicate any one of an operating channel, an operating band, or an operating channel and an operating band of the wake-up receiver; and the wake-up receiver is configured to obtain the indication information, and change an operating channel or an operating band according to content of the indication information.

According to a seventh aspect, this application further provides a station, where the station includes a wake-up receiver, and the wake-up receiver includes: a transceiver, configured to obtain indication information of an operating channel, an operating band, or an operating channel and an operating band that the wake-up receiver needs to change to; and a processor, configured to change an operating channel or an operating band of the wake-up receiver according to the indication information, and send, by using the transceiver, after-change feedback information. In addition, the transceiver is further configured to obtain channel quality; and the processor is further configured to generate, based on the channel quality, the indication information of the operating channel, the operating band, or the operating channel and the operating band that the wake-up receiver needs to change to.

According to an eighth aspect, this application provides a frame structure. The frame structure includes indication information used to indicate an operating channel or an operating band of a wake-up receiver. In addition, the frame structure further includes indication information used to indicate that a function of the frame is to manage or control the wake-up receiver. The frame structure further includes a sequence number used to indicate the operating channel of the wake-up receiver, or a sequence number used to indicate the operating band of the wake-up receiver. The indication information further includes a feedback response message of a main radio module, so as to inform a first station that the indication information is received.

According to a ninth aspect, this application further provides a computer storage medium. The computer storage medium may store a program and when the program is executed, some or all steps in the implementations of the indication information sending method and the indication information receiving method according to the present invention are included.

BRIEF DESCRIPTION OF THE DRAWINGS

To describe the technical solutions in the embodiments of this application more clearly, the following briefly describes the accompanying drawings required for describing the embodiments. Apparently, a person of ordinary skill in the art may derive other drawings from these accompanying drawings without creative efforts.

DETAILED DESCRIPTION OF ILLUSTRATIVE EMBODIMENTS

Figure 1:
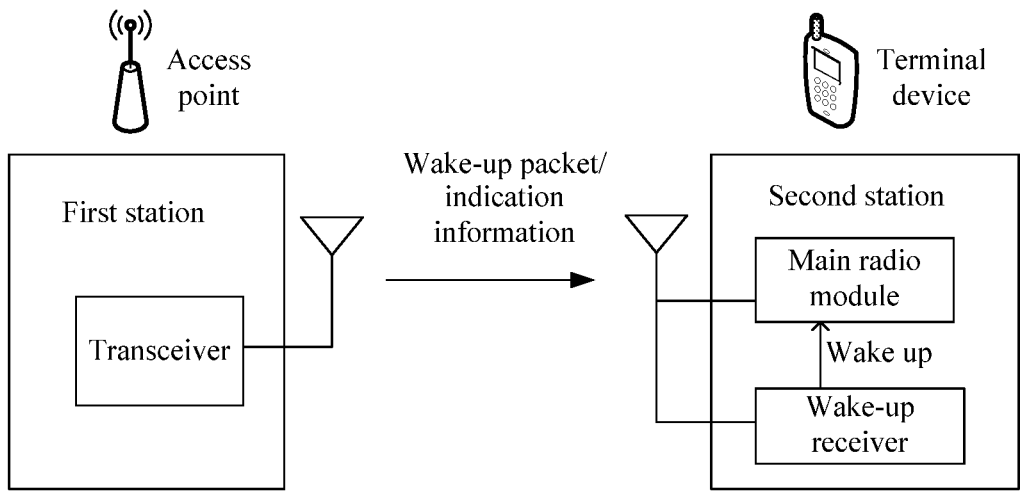
FIG. 1 is a schematic structural diagram of information exchange between a first station and a second station according to an embodiment of this application.

This application provides a series of embodiments to select an appropriate operating channel or operating band for a wake-up receiver in a second station, so as to reduce power consumption in channel rotation of the wake-up receiver, and thereby improve wake-up performance.

For ease of subsequent descriptions and clear description of this application, the following first briefly introduces concepts that may be used in this application.

In the embodiments of this application, a first station generates indication information for selecting an appropriate operating channel or operating band for a wake-up receiver. A band generally refers to a larger-granularity interval of carrier frequency. For example, a band 0 indicates TV white spaces, a band 1 indicates Sub–1 GHz (excluding TV white spaces), a band 2 indicates 2.4 GHz, a band 3 indicates 3.6 GHz, a band 4 indicates 4.9 GHz and 5 GHz, and a band 5 indicates 60 GHz. A channel represents a smaller-granularity division of a band. For example, a frequency resource with a bandwidth of 160 MHz in the 2.4 GHz band (band 2) may be divided into several channels.

The embodiments of this application are applied to a Wi-Fi network. FIG. 1 shows a schematic structural diagram of data exchange between a wake-up receiver and a transmit end, where it is assumed that the transmit end is a first station, and a receive end is a second station. The first station is configured to generate indication information, and the indication information is used to indicate an operating channel or an operating band on which a wake-up receiver of the second station needs to work, so that the wake-up receiver of the second station works according to content of the indication information. The second station includes the wake-up receiver (WUR) and a main radio module (main radio). The wake-up receiver is configured to listen to data packets, for example, wake-up packets (WUPs) from the first station. When the wake-up receiver receives a wake-up packet, the wake-up receiver wakes up the main radio module of the second station, so that the second station communicates with the first station by using the main radio module.

The first station in the embodiments of this application includes an access point (AP) or a wireless access point (WAP), or include a base station, an evolved base station, a relay having a scheduling function, a device having a function of a base station, or the like. The station may be an evolved Node B (eNB) in an LTE system, or a base station in another system. This is not limited in the embodiments of this application. The second station includes a device with a WLAN function, such as a station (STA), a non-AP, an Internet of Things device (IoT device), a mobile phone (cellphone), a smartphone, a computer, a tablet computer, a wearable device, a personal digital assistant (PDA), a mobile Internet device (MID), or an e-book reader. The Internet of Things (IoT). The wake-up receiver may be a wake-up radio module (wake-up radio), a low-power wake-up receiver (LP-WUR), or a low-power device provided with a listening channel and a wake-up receiver.

It should be noted that in the second station in the embodiments, the main radio module can only be woken up by the wake-up receiver of the second station. For example, according to the 802.11 protocol, an 802.11 main radio module of a second station can only be woken up by a wake-up receiver of the same station. Unless specifically stated in the following embodiments, the main radio module and the wake-up receiver are a main radio module and a wake-up receiver of a same station.

In addition, in the embodiments, an operating band or an operating channel of the wake-up receiver and that of the main radio module may be fixed, or may be changeable and adjustable. The wake-up receiver and the main radio module may work on a same band or channel, or may work on different bands or channels. For example, the wake-up receiver listens to data packets on a 2.4 GHz band, whereas the main radio module may work on the 2.4 GHz band or may work on a 5 GHz band.

If an available operating band range of the wake-up receiver is the same as an operating band range of the main radio module, or an operating band range of the wake-up receiver is a subset of an operating band range of the main radio module, in-band (In-band) setting is used. For example, the operating band range of the main radio module is 2.4 GHz to 2.483 GHz, and the wake-up receiver works on a specified band within the band range of 2.4 GHz to 2.483 GHz, for example, 80 MHz. The 80 MHz is divided into several sub-channels, for example, 2 MHz, 4 MHz, and 6 MHz, and the wake-up receiver works on one of the sub-channels (for example, 2 MHz).

If the available operating band range of the wake-up receiver is beyond the operating band range of the main radio module, out-band setting is used. For example, the operating band range of the main radio module is 2.4 GHz to 2.483 GHz, and the available operating band of the wake-up receiver is lower than 2.4 GHz, for example, a 20 MHz band that is lower than 2.4 GHz. The 20 MHz is divided into several sub-channels, for example, 2 MHz, 4 MHz, and 6 MHz, and the wake-up receiver can work on one of the sub-channels (for example, 2 MHz), or switch between different sub-channels.

Embodiment 1

Figure 2:
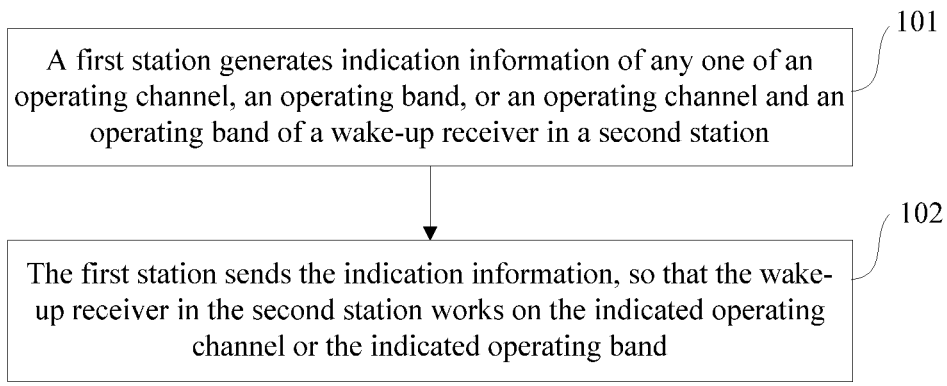
FIG. 2 is a schematic flowchart of an indication information sending method according to an embodiment of this application.

This embodiment provides an indication information sending method, used to indicate an operating channel or an operating band of a wake-up receiver in a second station. As shown in FIG. 2, the method includes the following steps.

Step 101: A first station generates indication information of any one of an operating channel, an operating band, or an operating channel and an operating band of a wake-up receiver in a second station.

Step 102: The first station sends the indication information, so that the wake-up receiver in the second station works on the indicated operating channel or the indicated operating band. Optionally, the first station sends the indication information to the second station by using a frame.

Specifically, that the first station generates indication information includes that the first station obtains channel information between the first station and the second station. The channel information includes channel state information (CSI), coarse channel state information (coarse CSI), or signal-to-noise ratios (SNRs) of the wake-up receiver on sub-channels.

Further, manners for obtaining the channel information by the first station include the following.

Manner 1: The first station obtains the channel information by communicating with the second station. Specifically, the first station can select an appropriate channel for the wake-up receiver based on known information. For example, when the first station performs uplink or downlink communication with the second station, the first station records information about quality of links between the two stations during communication, or quality information of operating channels of the wake-up receiver, and analyzes information related to these links to obtain the channel information between the first station and the second station.

For example, the wake-up receiver has 4 available channels, and the first station obtains through uplink and downlink communication with the second station that in the 4 channels, an SNR of a channel 1 is 20 dB, an SNR of a channel 2 is 15 dB, an SNR of a channel 3 is 0 dB, and an SNR of a channel 4 is −5 dB. Based on such information, the first station can determine that channel quality of the channel 1 is better than channel quality of the other 3 channels. Therefore, the channel 1 is selected as the operating channel of the wake-up receiver, and content indicating the channel 1 is sent to the second station by using a frame or a data packet.

Manner 2: The first station directly obtains the channel information from the second station. Specifically, the first station sends a request frame to the second station, to trigger a channel measurement operation of the second station. After completing channel information measurement, the second station feeds back a measurement result to the first station. For example, the request frame sent by the first station may be an NDP-A (null data packet announcement) frame, or a trigger frame. The trigger frame is used to instruct the main radio module in the second station to feed back coarse channel state information (coarse CSI). The NDP-A frame is used to instruct the second station to start a channel detection mode, measure channels by using an NDP (null data packet) frame from the first station to obtain the channel information, and finally send the channel information to the first station.

Further, in a solution, the first station generates indication information indicating an operating band of the wake-up receiver. For example, 1, 2, or 3 bits are used to indicate an operating band that shall be used subsequently, for example, any one of combinations of the Band 0 to the Band 5. For example, a wake-up receiver of a station may work on a 2.4 GHz band or a 5 GHz band, without involving other bands. The indication information may include a 1-bit field, and the field may be "i" or "o", where "o" indicates that the wake-up receiver works on the 2.4 GHz band, and "i" indicates that the wake-up receiver works on the 5 GHz band. If the field in the indication information is "i", it indicates that the wake-up receiver works on the 5 GHz band. Certainly, indication of "i" or "o" may be set reversely. If the wake-up receiver can work on more bands, more bits are required for the indication. Details are not described herein.

Alternatively, in another solution, the wake-up receiver works on a particular operating band, and the first station does not need to indicate this operating band. However, the wake-up receiver may work on any one of a plurality of operating channels. In this solution, depending on a quantity of operating channels of the wake-up receiver, the indication information may occupy a plurality of bits. For example, the wake-up receiver has 10 available operating channels, which are a channel 1, a channel 2, . . . , and a channel 10, respectively. The indication information includes a field with a preset fixed length, for example, a 4-bit field. "0001" represents an operating channel 1, "0010" represents an operating channel 2, "0011" represents an operating channel 3, and so on. If content of the field in the indication information received by the second station is "0011", then based on the correspondence, the wake-up receiver works on the channel 3. It should be noted that a mapping relationship between the field content "0001" and a channel described in this implementation may be set freely. A specific operating channel planning rule, and mapping between corresponding operating channel numbers and field bits are not limited in this application. Based on the foregoing indication manner, an example of a process of instructing the wake-up receiver in the second station to change an operating channel is: The wake-up receiver currently works on the channel 1, and indication content of the indication information is the channel 3, then after receiving the indication information, the wake-up receiver works on the channel 3 according to the content of the indication information.

Alternatively, in another solution, the first station generates indication information indicating an operating channel and an operating band of the wake-up receiver. The indication information includes one or more bits used for indicating the operating band, and another one or more bits used for indicating the operating channel. Certainly, one or more bits may be used to indicate both the operating band and the operating channel. In an example, the indication information is set to include a 5-bit field, where one bit indicates the operating band, and four bits indicate the operating channel. For example, the 5-bit field is set to be "10011", where "1" represents a 5 GHz band, and "0011" represents a channel 3. In this example, a process of instructing the wake-up receiver in the second station to change an operating channel includes: The wake-up receiver currently works on a channel 1 of a 2.4 GHz band, the indication information includes content about the channel 3 of the 5 GHz operating band, and the wake-up receiver works on the channel 3 of the 5 GHz operating band according to the content of the indication information.

It should be noted that a channel indicated in the indication information in the embodiments of this application may be the same as or different from the operating channel of the wake-up receiver. This is not limited in this application. A specific operating channel planning rule, and mapping between corresponding operating channel numbers and field bits are not specifically limited in this application.

According to the method provided in this embodiment, the first station generates the indication information used to indicate the operating channel or the operating band of the wake-up receiver in the second station, so as to make the wake-up receiver work according to the content of the indication information, and avoid frequent periodic switching of the wake-up receiver between operating channels or operating bands, which leads to increased power consumption of the wake-up receiver.

In addition, according to the method provided in Embodiment 1, the first station may further generate indication information for wake-up receivers in a plurality of stations (including the second station) based on channel information provided by the plurality of stations, so as to indicate operating bands or operating channels of these wake-up receivers.

For example, for a system including three receive-end stations, a first station may generate three frames based on channel information provided by each station, where each frame includes indication information, and sends the three frames to corresponding stations, so that the three receive ends within coverage of the first station change operating channels or operating bands of their wake-up receivers according to content of the indication information, thereby improving spectrum utilization.

In Embodiment 1, when generating indication information, the first station may generate the indication information comprehensively based on other information in addition to the channel information, for example, based on information about other stations in a cell in which the first station or the second station is located. This further improves wake-up efficiency.

Embodiment 2

This embodiment provides a frame, where the frame carries indication information used to indicate an operating channel or an operating band of a wake-up receiver. The indication information is further used to manage or control the wake-up receiver, for example, to instruct the wake-up receiver to feed back an acknowledgment message, so that a transmit-end first station learns that a wake-up receiver in a second station has received the frame.

The frame includes a data frame, a management frame, and a control frame. Further, the frame further includes one or more of the following information:

information indicating the operating channel or the operating band of the wake-up receiver, which may be carried in a subtype field;

information used to control or manage the wake-up receiver, which may be carried in a frame type field; and a feedback response message of a main radio module in the second station, so as to inform the first station that the indication information is received. Specifically, the frame includes a preset field, and the field indicates the feedback response message of the second station. Further, this may be implemented by including a corresponding sending or receiving address in the frame. For example, when the frame is sent by a first access point (AP) to the main radio module (main radio) in the second station, the frame may include a particular main radio address, a main radio group address, or a main radio broadcast address to indicate the main radio at the corresponding address, so as to indicate wake-up receivers of all stations in a cell in which the AP is located.

Figure 3:
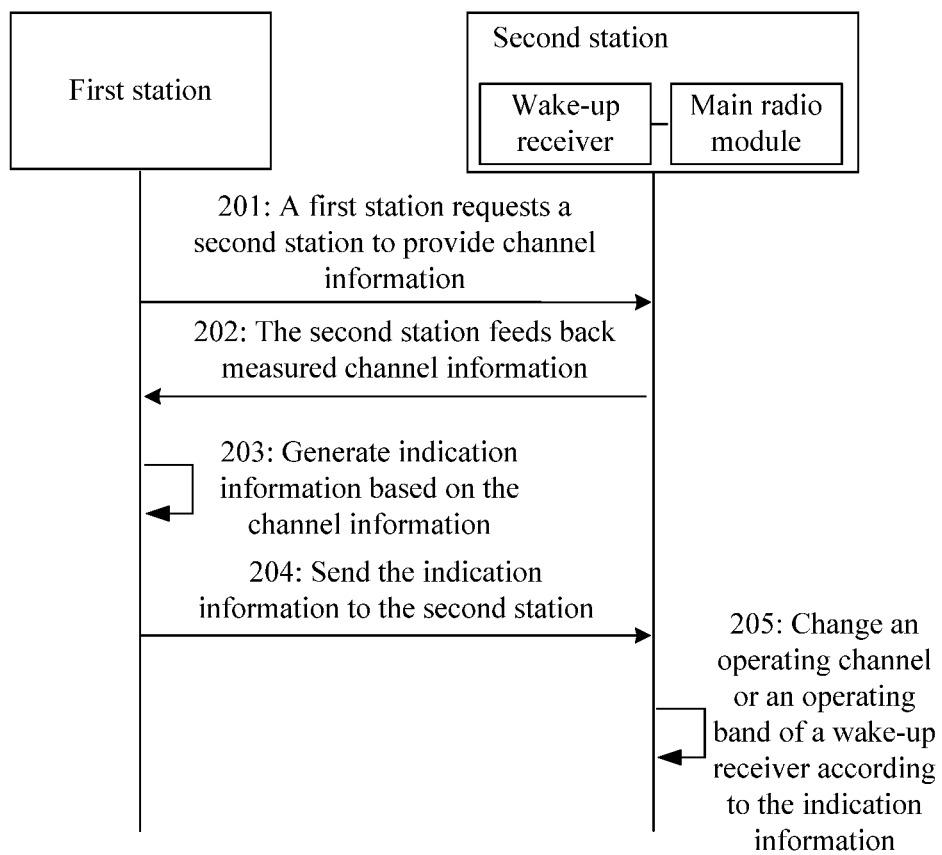
FIG. 3 is a signaling flowchart of an indication information sending method according to an embodiment of this application.

As shown in FIG. 3, the indication information generation method provided in this embodiment includes the following steps.

Step 201: A first station requests a second station to provide channel information. For example, the first station sends a request frame to the second station to start channel measurement by the second station.

Step 202: After receiving the request frame, the second station starts channel measurement, and sends measured channel information, for example, CSI, to the first station.

Step 203: The first station receives the channel information, and generates indication information based on the channel information, where the indication information is used to indicate an operating channel, an operating band, or an operating channel and an operating band of a wake-up receiver.

Step 204: The first station sends the indication information to the second station, so that the wake-up receiver in the second station works according to content of the indication information. Optionally, the first station sends the indication information on the operating channel or operating band of the wake-up receiver.

Step 205: The second station receives the indication information sent by the first station. If the content of the indication information is different from the current operating channel or operating band of the wake-up receiver, the wake-up receiver changes to work on the operating channel or the operating band indicated by the indication information.

Optionally, in step 203, when generating the indication information, the first station further generates the indication information based on information such as quality of links between the first station and the second station, and quality of channels in which the wake-up receiver is located.

Embodiment 3

In this embodiment, indication information generated by a first station is used not only to indicate an operating channel or an operating band of a wake-up receiver in a second station, but also to indicate an operating channel or an operating band of a main radio module in the second station, so as to improve management efficiency of the indication information.

Specifically, in this embodiment, operating channels and operating bands of both the main radio module and the wake-up receiver in the second station are adjustable. For example, the main radio module is a narrowband device supporting the 802.11ah standard, or the main radio module is a narrowband IoT device. In this case, the first station needs to manage and control operating channels and operating bands of a plurality of devices (including the main radio module and the wake-up receiver) included in the second station.

Further, a control method includes: generating, by the first station, indication information based on channel information between the first station and the second station, where the indication information is used to not only indicate the operating channel or the operating band of the wake-up receiver, but also indicate the operating channel, the operating band, or the operating channel and the operating band of the main radio module, and content for managing or controlling the main radio module.

The first station sends the indication information to the second station by using a frame or a data packet. Optionally, the first station sends the indication information to the wake-up receiver, or sends the indication information to the main radio module, or sends the indication information to both the wake-up receiver and the main radio module.

It should be noted that generally, the wake-up receiver receives the indication information from the first station. If a wake-up packet (WUP) is received, the main radio module is woken up. In this embodiment, that the first station sends the indication information to the main radio module means that the main radio module of the second station is in an operating mode (not sleeping), able to normally receive data and information sent by the first station.

A specific manner how the indication information indicates the operating channel, the operating band, or the operating channel and the operating band of the main radio module is the same as the manner how the indication information is used to manage the wake-up receiver in the foregoing embodiment. Details are not described herein again. After receiving the indication information, the main radio module changes the operating channel or the operating band according to the content of the indication information.

Embodiment 4

A difference between this embodiment and the foregoing embodiment lies in that a second station proactively sends information to a first station to request for change of an operating channel or an operating band of a wake-up receiver. Specifically, the second station sends a data frame or a data packet to the first station to request for change of the operating channel, where the data frame or the data packet includes channel information. Further, the channel information includes at least one of the following information: channel state information (CSI) of channels or bands that are selectable by the wake-up receiver; a channel quality sequence of channels or bands that are selectable by the wake-up receiver; a number of one or more channels or bands that the wake-up receiver recommends the first station to change to; and channel power gains of some or all available channels between the wake-up receiver and the first station.

The first station receives the data frame or the data packet sent by the second station, and generates indication information based on information in the data frame or the data packet, so as to indicate an operating channel or an operating band on which the wake-up receiver needs to work.

The first station sends the generated indication information to the second station. A specific manner how the indication information instructs the wake-up receiver to change an operating channel or an operating band is the same as that in Embodiment 1. Therefore, reference may be made to the method in Embodiment 1, and details are not described again in this embodiment.

In this embodiment, the second station proactively reports the channel information to the first station, to request for change of the operating channel or the operating band of the wake-up receiver. This spares a process of sending a request to the second station by the first station, reduces air interface overheads, and improves transmission efficiency.

Embodiment 5

This embodiment provides an information sending method, and the method is used to indicate an operating channel or an operating band of a wake-up receiver in a station. A difference between the method in this embodiment and that in the foregoing embodiment lies in that under a given condition, a wake-up receiver in a receive-end device, for example, a second station, can change an operating channel or an operating band proactively, and sends a changed-to operating channel or operating band to a first station by using frame information or a data packet.

Specifically, based on measured channel information, the second station triggers a proactive change operation when a change condition is met, for example, when quality of an operating channel of the wake-up receiver is relatively poor, or when the wake-up receiver cannot work normally on the operating channel or operating band of the wake-up receiver to receive a wake-up packet sent by the first station. A processor in the second station, or a processor in the wake-up receiver determines, based on the measured channel information, an operating channel or an operating band that needs to be changed, then changes the operating channel or the operating band of the wake-up receiver to the determined operating channel or operating band, and finally, sends information such as a sequence number of the changed-to operating channel or operating band to the first station.

An optional changing manner is: The wake-up receiver dynamically selects, in a jump mode, an operating channel from a set of available channels, and when a preset time interval expires, the wake-up receiver changes to a next available channel. For example, the wake-up receiver currently works on a channel n, changes to a channel n+1 after a time interval T, and changes to a channel n+2 after another time interval T. This jump mode may be a preset jump mode, or a jump mode agreed on with the first station. Whichever jump mode is used, the first station can learn of the operating channel or the operating band of the wake-up receiver in a timely manner, so as to ensure normal communication between the first station and the second station.

Further, the method provided in this embodiment specifically includes: sending, by the second station, a frame to the first station, where the frame is used to inform the first station that the wake-up receiver dynamically selects, in a jump mode, an operating channel or an operating band.

The wake-up receiver in the second station selects an operating channel or an operating band based on a specified or an agreed jump mode, and works on the selected channel or the selected band.

After receiving information sent by the second station that the operating channel or the operating band has been changed, the first station sends a wake-up packet to the second station on the changed-to channel or band, to wake up the wake-up receiver. Optionally, the first station may send the wake-up packet on the corresponding channel or band according to the specified or the agreed jump mode. Alternatively, the first station may send the wake-up packet on all channels or bands, so as to ensure that the second station can receive the wake-up packet.

According to the method provided in this embodiment, the second station is capable of proactively changing the operating channel or the operating band, and notifies the first station of the changed-to operating channel or operating band, so that the first station can send a data packet on the corresponding channel or band. This avoids that the first station generates indication information and sends the indication information to the wake-up receiver, further reduces air interface overheads, and reduces a latency for changing the operating band or the operating channel by the wake-up receiver.

Embodiment 6

This embodiment is applied to an out-band scenario. The out-band scenario means that an available operating band range of a wake-up receiver in a second station is out of an operating band range of a main radio module. For example, the operating band range of the main radio module is 2.4 GHz to 2.483 GHz, and the available operating band of the wake-up receiver is 20 MHz that is lower than 2.4 GHz. If an available channel or band of the wake-up receiver is different from an available channel or band of the main radio module, the main radio module assists in measuring and managing the operating channels of the wake-up receiver. The specific process is as follows.

Figure 4:
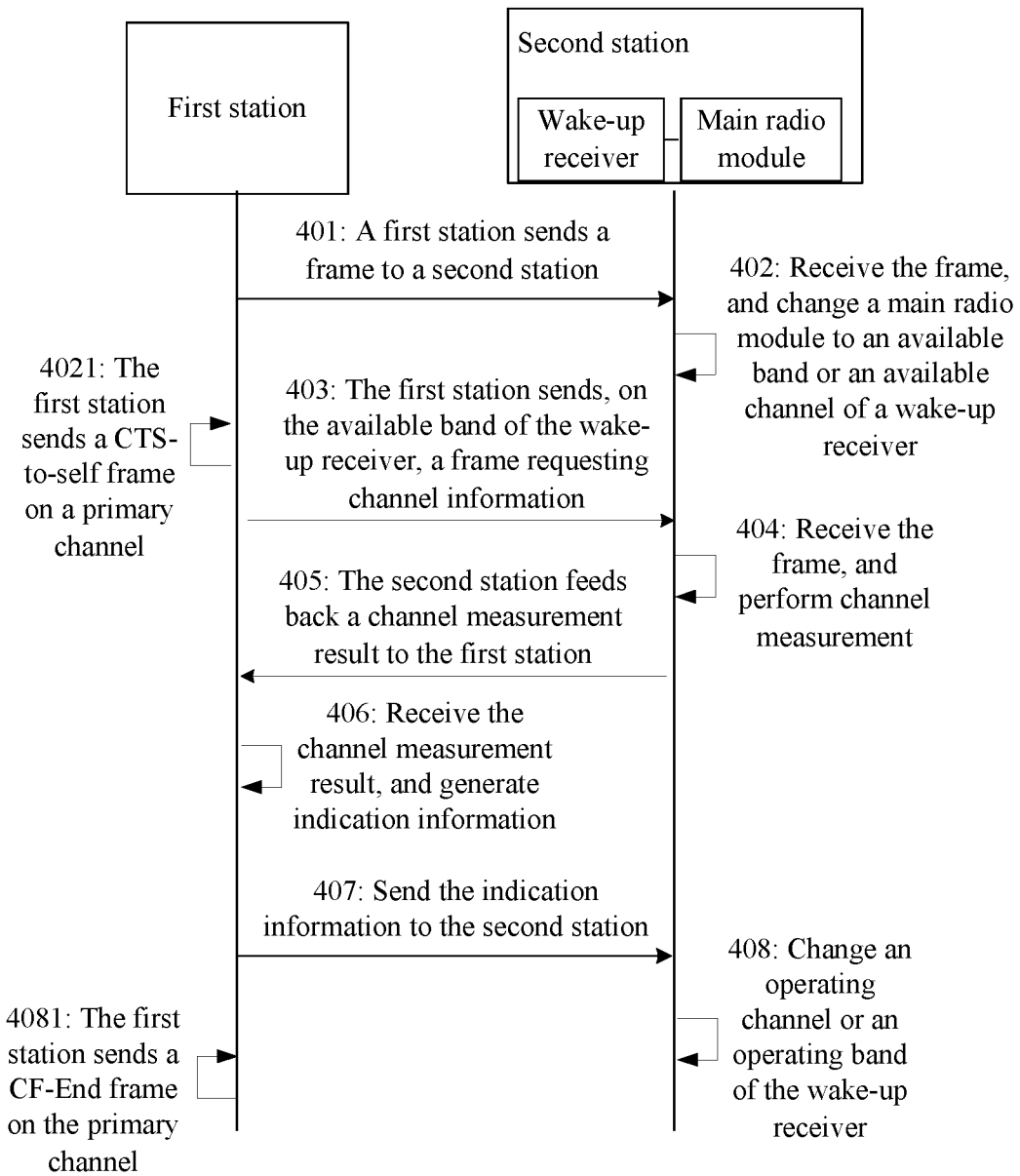
FIG. 4 is a signaling flowchart of another indication information sending method according to an embodiment of this application.

As shown in FIG. 4, step 401: A first station sends a frame to a second station, where the frame is used to instruct a main radio module to change to an available band or an available channel of a wake-up receiver.

Optionally, the frame is sent by the first station to the main radio module. The frame may be a main radio frame defined in the 802.11 protocol. The frame may be sent on any channel on which the first station is located, or may be sent on a primary operating channel (primary channel) on which the first station is located.

The frame may be a wake-up packet. If the frame is a wake-up packet, the wake-up packet is used to indicate that an operating band or an operating channel of the main radio module can be changed to an available channel or an available band that is the same as that of the wake-up receiver in the second station.

Further, the "instruct a main radio module to change to an available band or an available channel of a wake-up receiver" may be instructing a particular main radio module, a group of main radio modules, or all main radio modules equipped with wake-up receivers. Specifically, this may be implemented by including a corresponding receiving address in the frame. For example, when the frame is sent by the first station to the main radio module, the frame may include a particular main radio address, a main radio group address, or a main radio broadcast address to instruct a main radio module(s) at the corresponding address. When the frame is sent by the first station to the wake-up receiver, the frame may include a particular wake-up receiver address, a wake-up receiver group address or a wake-up receiver broadcast address, to instruct a main radio module(s) to which a wake-up receiver(s) at the corresponding address is attached to change to the available band or the available channel of the wake-up receiver.

Step 402: The second station receives the frame sent by the first station, and changes an operating band or an operating channel of the main radio module to the available band or the available channel of the wake-up receiver according to content indicated by the frame.

Step 403: The first station sends, on the available band of the wake-up receiver, a frame for requesting channel information, where the frame is used to start channel measurement of the second station. Further, the frame may be an NDP frame or a trigger frame.

Step 404: After receiving the data frame indicating channel measurement, the main radio module in the second station performs channel measurement and generates a channel measurement result.

Step 405: The second station feeds back the channel measurement result to the first station.

Step 406: The first station receives the channel measurement result, generates, based on the channel measurement result, indication information used to indicate an operating channel, an operating band, or an operating channel and an operating band of the wake-up receiver, and sends the indication information to the second station. Optionally, the first station may send the indication information on a band on which the main radio module is currently located, or send the indication information on a band on which the wake-up receiver is currently located.

If the second station determines that the operating channel or the operating band indicated by the obtained indication information is the same as the current operating channel or operating band of the wake-up receiver, it is not necessary to change the operating channel or the operating band, and the main radio module of the second station does not need to send the indication information to the wake-up receiver. The indication information is sent to the wake-up receiver only when the current operating channel or operating band of the wake-up receiver is different from the content of the indication information.

Further, between step 402 and step 403, the following step is further included:

Step 4021: The first station sends a frame on a primary channel, where the frame is used to set a period of protection time, or to instruct other stations in a cell in which the first station is located not to send uplink data to the first station within a specified period. The frame may be a CTS-to-self frame. A second station receiving the frame no longer sends uplink data to the first station within the specified period. If an available band or an available channel of the first station is different from that of the wake-up receiver, the first station also needs to first change to the available band or the available channel of the wake-up receiver, and communicates with the second station on this band or channel. The CTS-to-self frame is used to instruct other stations not to send uplink data to the first station within the specified period, so as to avoid interference to the first station.

After the first station changes the operating band or the operating channel in step 406, step 407 is performed: The first station and the main radio module in the second station change back to the before-change operating channel or operating band. If the time interval specified by the CTS-to-self or the protection time interval has not expired, the first station sends a CF-End frame on the primary channel (step 4081), to release remaining air interface time.

Step 408: The second station changes the operating channel or the operating band of the wake-up receiver according to the indication information.

In this embodiment, when the available operating band range of the wake-up receiver in the second station device is out of the operating band range of the main radio module, the available band of the main radio module needs to be changed first to make the available band of the main radio module the same as the available band of the wake-up receiver, before the indication information sent by the first station is received, so that the first station can indicate the operating channel or the operating band of the wake-up receiver.

In addition, after the main radio module changes to the operating band or the operating channel that is the same as that of the wake-up receiver, the first station changes its operating channel or operating band correspondingly. Therefore, the first station sends the CTS-to-self frame on the primary channel to ensure that uplink data sent by other stations is not received during the specified protection time. This avoids impact on other stations in the cell due to change of the operating channel by the first station. After communication between the first station and the second station is completed, the first station sends the CF-End frame to release remaining air interface time, thereby reducing air interface overheads.

Embodiment 7

Figure 5:
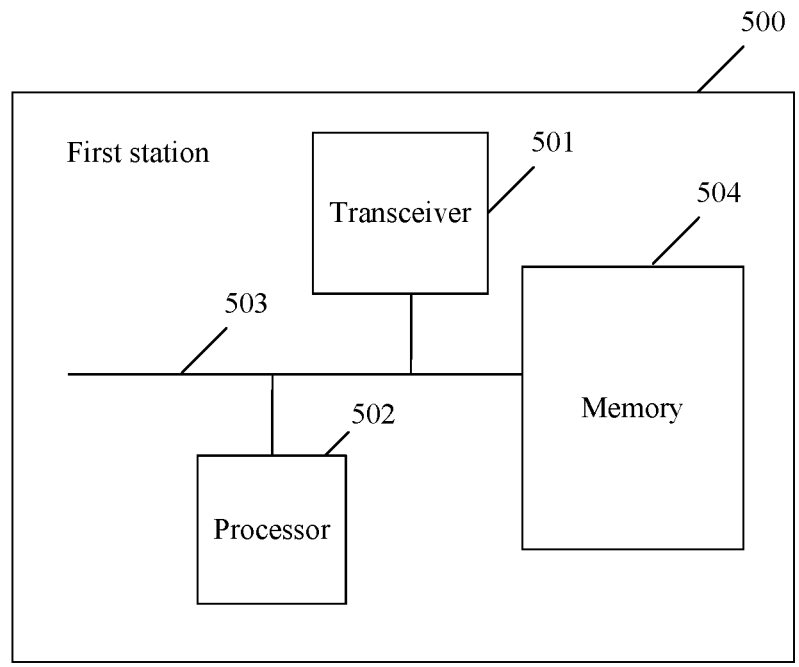
FIG. 5 is a schematic structural diagram of a first station according to an embodiment of this application.

This embodiment provides a first station, configured to instruct a WUR in a second station to change an operating channel or an operating band. As shown in FIG. 5, the first station includes a transceiver 501 and a processor 502.

The processor 502 is configured to generate indication information of any one of an operating channel, an operating band, or an operating channel and an operating band of the wake-up receiver in the second station.

The transceiver 501 is configured to send the first frame to the second station, so that the WUR changes to the operating channel or the operating band indicated by the first frame.

Optionally, the transceiver 501 is further configured to obtain channel information between the first station and the second station, where the second station includes the wake-up receiver. The processor 502 is further configured to generate the indication information based on the channel information.

The first station provided in this embodiment can generate the indication information based on the channel information between the first station and the second station, and send the indication information to the second information by using a frame or a data packet, so that the wake-up receiver in the second station works on the operating channel or the operating band indicated by the indication information. This avoids frequent switching of the wake-up receiver between operating channels or operating bands, and reduces power consumption of the wake-up receiver.

Optionally, the transceiver 501 is further configured to send a request message for requesting the second station to provide the channel information, and is further configured to obtain the channel information between the first station and the second station according to the request message.

The first station further includes a main radio module, and the transceiver is specifically configured to send the indication information to the wake-up receiver, or send the indication information to the main radio module, or send the indication information to both the wake-up receiver and the main radio module.

Optionally, the transceiver 501 is further configured to send the indication information on the operating channel or operating band of the wake-up receiver.

Optionally, the indication information includes at least the following content: a sequence number indicating the operating channel, the operating band, or the operating channel and the operating band of the wake-up receiver; content instructing the main radio module to feed back a response message; content indicating an operating channel, an operating band, or an operating channel and an operating band of the main radio module; or content used to manage or control the main radio module.

Optionally, the channel information includes at least the following information: channel state information CSI of channels or bands that are selectable by the wake-up receiver; a channel quality sequence of channels or bands that are selectable by the wake-up receiver; and a number of one or more channels or bands that the wake-up receiver recommends the first station to change to.

In addition, the processor 502 is further configured to determine whether the operating channel or the operating band of the wake-up receiver is the same as that of the main radio module. If the operating channel or the operating band of the wake-up receiver is different from that of the main radio module, the transceiver sends, to the second station, information used to instruct the main radio module to change to the operating channel or the operating band of the wake-up receiver, so that the operating channel or the operating band of the main radio module is the same as that of the wake-up receiver.

The processor 502 is further configured to broadcast a frame on a primary channel, where the frame is used to set a protection time, or to instruct other stations in a cell in which the first station is located not to send data to the first station within a specified time interval, and to change an operating channel or an operating band of the first station to an operating channel or an operating band the same as that of the wake-up receiver in the second station. If sending of the frame is completed within the specified time interval, meaning that the wake-up receiver has completed change of the operating channel or the operating band, the transceiver 501 is further configured to send a CF-End frame on the primary channel, to end the protection time of the first station.

In addition, the first station further includes a communications bus 503 and a memory 504.

Figure 6:
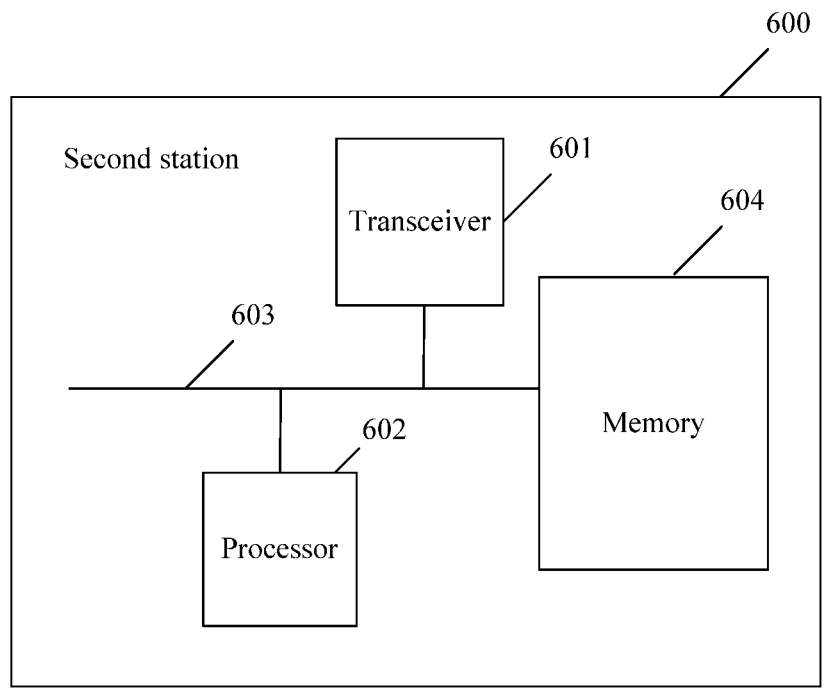
FIG. 6 is a schematic structural diagram of a second station according to an embodiment of this application.

Corresponding to the first station, an embodiment further provides a second station that includes a wake-up receiver. As shown in FIG. 6, the second station includes a transceiver 601 and a processor 602, and further includes a communications bus 603 and a memory 604.

The transceiver 601 is configured to receive indication information, where the indication information includes content indicating an operating channel or an operating band of the wake-up receiver.

The processor 602 is configured to change an operating channel or an operating band of the wake-up receiver according to the content of the indication information, so that the wake-up receiver works on the indicated operating channel or the indicated operating band.

Optionally, the transceiver 601 is further configured to obtain a request message for providing channel information, and send measured channel information according to the request message.

An embodiment of this application further provides another second station, where the second station includes a main radio module and a wake-up receiver, the main radio module is configured to receive indication information, and forward the indication information to the wake-up receiver, where the indication information is used to indicate any one of an operating channel, an operating band, or an operating channel and an operating band of the wake-up receiver; and the wake-up receiver is configured to obtain the indication information, and change an operating channel or an operating band according to content of the indication information.

In another embodiment, a station including a wake-up receiver is provided, where the wake-up receiver includes a transceiver and a processor. The transceiver is configured to obtain indication information of an operating channel, an operating band, or an operating channel and an operating band that the wake-up receiver needs to change to; and the processor is configured to change an operating channel or an operating band of the wake-up receiver according to the indication information, and send, by using the transceiver, after-change feedback information.

Optionally, the transceiver is further configured to obtain channel quality; and the processor is further configured to generate, based on the channel quality, the indication information of the operating channel, the operating band, or the operating channel and the operating band that the wake-up receiver needs to change to.

An embodiment provides an indication information exchanging system. The system includes a first station and a second station, where the second station includes a wake-up receiver and a main radio module. The wake-up receiver is configured to wake up the main radio module in the second station, so that the second station communicates with the first station.

The first station is configured to generate indication information of any one of an operating channel, an operating band, or an operating channel and an operating band of the wake-up receiver in the second station; and send the indication information, so that the wake-up receiver in the second station works on the indicated operating channel or the indicated operating band.

The second station is configured to receive the indication information, where the indication information is used to indicate any one of the operating channel, the operating band, or the operating channel and the operating band of the wake-up receiver; and change an operating channel or an operating band of the wake-up receiver according to the content of the indication information, so that the wake-up receiver works on the indicated operating channel or the indicated operating band.

Optionally, the first station is further configured to obtain channel information between the first station and the second station, and generate the indication information based on the channel information. Further, the first station sends a request message to request the second station to provide the channel information. After receiving the request message, the second station performs channel measurement, and sends the channel information to the first station. The first station is further configured to obtain the channel information between the first station and the second station.

The indication information is further used to manage or control the wake-up receiver in the second station.

Optionally, that the first station sends the indication information includes: the first station sends the indication information to the wake-up receiver, or the first station sends the indication information to the main radio module, or the first station sends the indication information to both the wake-up receiver and the main radio module. Further, that the first station sends the indication information to the wake-up receiver specifically includes: the first station sends the indication information on the operating channel or operating band of the wake-up receiver.

Optionally, the indication information includes a sequence number indicating the operating channel, the operating band, or the operating channel and the operating band of the wake-up receiver; content instructing the main radio module to feed back a response message, so as to inform the first station that the indication information is received; content indicating an operating channel, an operating band, or an operating channel and an operating band of the main radio module; or content used to manage or control the main radio module.

Further, the second station is further configured to generate and send information for requesting to change the operating channel or the operating band of the wake-up receiver, and the information includes: channel state information CSI of channels or bands that are selectable by the wake-up receiver; a channel quality sequence of channels or bands that are selectable by the wake-up receiver; and a number of one or more channels or bands that the wake-up receiver recommends the first station to change to.

In the indication information exchanging system provided in this embodiment, the first station can select, based on the channel information between the first station and the second station, an operating channel or an operating band that is suitable for the wake-up receiver to work on, and send the indication information to the second station by using a frame, so that the second station can control the wake-up receiver in the second station to work on the operating channel or the operating band indicated by the indication information. This avoids frequent switching of the wake-up receiver between operating channels or operating bands, and reduces power consumption of the wake-up receiver.

Further, in the first station and the second station in the embodiments of this application, the processor may be a general-purpose central processing unit (CPU), a microprocessor, an application-specific integrated circuit (ASIC), or one or more integrated circuits for controlling execution of a solution program of the present invention.

The memory may be a read-only memory (ROM) or other types of static storage devices that can store static information and instructions, or a random access memory (RAM) or other types of dynamic storage devices that can store information and instructions, or may be an electrically erasable programmable read-only memory (EEPROM), a read-only optical disc (CD-ROM) or other optical disc storage media, an optical disc storage medium (including a compact disc, a laser disc, an optical disc, a digital versatile disc, a Blu-ray disc, or the like), a magnetic disc storage medium or other magnetic storage devices, or any other media that can be used to carry or store expected program code in a forms of instructions or data structures and that can be accessed by a computer, without being limited thereto. The memory may exist independently, or may be integrated with the processor. The memory is configured to store application program code used for executing a solution of the present invention, and the processor controls the execution. The processor is configured to execute the application program code stored in the memory.

In addition, the first station and the second station further both include unit structures corresponding to the transceiver and the processor. For example, the first station includes a transceiver unit, a processor unit, and a storage unit, and the second station includes a transceiver unit, a processor unit, and a storage unit. Functions of these units are the same as functions of the foregoing transceiver, processor, and memory, respectively.

The first station device in the embodiments of this application is configured to implement some or all functions in the indication information sending method in the foregoing embodiments, and the second station is configured to implement some or all functions in the indication information receiving method in the foregoing embodiments.

An embodiment of the present invention further provides a computer storage medium, configured to store computer software instructions used in the indication information sending method and the indication information receiving method shown in FIG. 2, FIG. 3, or FIG. 4, where the computer storage medium contains a program designed for executing the foregoing method embodiments. By executing the stored program, indication of an operating channel or an operating band of a wake-up receiver can be implemented.

A person skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code. The computer program is stored/distributed in an appropriate medium and is provided together with other hardware or used as a part of hardware, or may be distributed in other forms, for example, via the Internet or other wired or wireless telecommunications systems.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a function specified in one or more processes in the flowcharts and/or in one or more blocks in the block diagrams.

These computer program instructions may also be loaded onto a computer or other programmable data processing devices, so that a series of operations and steps are performed on the computer or the other programmable devices, thereby generating computer-implemented processing. Therefore, the instructions executed on the computer or the other programmable devices provide steps for implementing a function specified in one or more processes in the flowcharts and/or in one or more blocks in the block diagrams.

For identical or similar parts of the embodiments in the specification, mutual reference may be made. Especially, the device embodiments are essentially similar to the method embodiments, and therefore are described briefly. For related information, reference may be made to descriptions in the method embodiments.

The foregoing implementations of this application are not intended to limit the protection scope of this application.

What is claimed is:

1. A method, comprising:
    receiving, by a second station from a first station, a request message that requests the second station to provide channel information of a channel quality of a channel between the first station and the second station;
    in response to receiving the request message, sending, by the second station, the channel information to the first station;
    receiving, by the second station from the first station, indication information, wherein the second station comprises a wake-up receiver and a main radio circuit, the indication information is generated based on the channel information, and the indication information indicates:
        a first operating channel of the wake-up receiver for listening for a wakeup packet;
        a first operating band of the wake-up receiver for listening for a wakeup packet; or
        the first operating channel of the wake-up receiver for listening for a wakeup packet and the first operating band of the wake-up receiver for listening for a wakeup packet;
    in response to receiving the indication information, changing, by the second station, a currently-used operating channel of the wake-up receiver or a currently-used operating band of the wake-up receiver according to content of the indication information, causing the wake-up receiver to listen on the indicated first operating channel or the indicated first operating band for a wakeup packet corresponding to the second station; and
    in response to receiving a wake-up packet corresponding to the second station on the currently-used operating channel of the wake-up receiver or the currently-used operating band of the wake-up receiver, causing, by the wake-up receiver, the main radio circuit to wake up using a currently-used operating channel of the main radio circuit.

2. The method according to claim 1, wherein the channel information comprises:
- channel state information (CSI) of channels or bands that are selectable by the wake-up receiver;
- a channel quality sequence of channels or bands that are selectable by the wake-up receiver; or
- a number of the first operating channel or the first operating band.

3. The method according to claim 1, wherein receiving the indication information comprises:
- receiving, by the wake-up receiver, the indication information; or
- receiving, by the main radio circuit, the indication information; or
- receiving, by both the wake-up receiver and the main radio circuit, the indication information.

4. A first station, comprising:
a processor; and
a non-transitory computer-readable storage medium storing a program to be executed by the processor, the program including instructions for:
- send a request message to a second station that requests the second station to provide channel information of a channel quality of a channel between the first station and the second station;
- obtain the channel information that is sent by the second station, the channel information being sent in response to the request message;
- selecting, based on the received channel information, a first operating channel of a wake-up receiver of the second station for listening for a wakeup packet, a first operating band of the wake-up receiver for listening for a wakeup packet, or the first operating channel of the wake-up receiver for listening for a wakeup packet and the first operating band of the wake-up receiver for listening for a wakeup packet;
- generating, based on the selected first operating channel of the wake-up receiver for listening for a wakeup packet, the selected first operating band of the wake-up receiver for listening for a wakeup packet, or the selected the first operating channel of the wake-up receiver for listening for a wakeup packet and the first operating band of the wake-up receiver for listening for a wakeup packet, indication information of the wake-up receiver of the second station, the indication information indicating:
  - the selected first operating channel of the wake-up receiver for listening for a wakeup packet;
  - the selected first operating band of the wake-up receiver for listening for a wakeup packet; or
  - the selected first operating channel of the wake-up receiver for listening for a wakeup packet and the selected first operating band of the wake-up receiver for listening for a wakeup packet; and
a transceiver, configured to send the indication information, causing the wake-up receiver of the second station to listen on the indicated first operating channel or the indicated first operating band for a wakeup packet corresponding to the second station.

5. The first station according to claim 4, wherein the channel information comprises:
- channel state information (CSI) of channels or bands that are selectable by the wake-up receiver.

6. The first station according to claim 4, wherein the second station further comprises a main radio circuit, and the transceiver is configured to:
- send the indication information to the wake-up receiver; or
- send the indication information to the main radio circuit; or
- send the indication information to both the wake-up receiver and the main radio circuit.

7. The first station according to claim 6, wherein the indication information comprises:
- a sequence number indicating the selected first operating channel, the selected first operating band, or the selected first operating channel and the selected first operating band, wherein the selected first operating channel is of the wake-up receiver and the selected first operating band is of the wake-up receiver.

8. The first station according to claim 6, wherein the indication information comprises:
- content instructing the main radio circuit to feed back a response message.

9. The first station according to claim 6, wherein the indication information comprises:
- content indicating the selected first operating channel, the selected first operating band, or the selected first operating channel and the selected first operating band, wherein the selected first operating channel is of the main radio circuit and the selected first operating band is of the main radio circuit.

10. The first station according to claim 6, wherein the indication information comprises:
- content used to manage or control the main radio circuit.

11. The first station according to claim 4, wherein the channel information comprises:
- a channel quality sequence of channels that are selectable by the wake-up receiver.

12. The first station according to claim 4, wherein the channel information comprises:
- a channel quality sequence of bands that are selectable by the wake-up receiver.

13. A second station, comprising:
a transceiver, configured to:
- receive, from a first station, a request message that requests the second station to provide channel information of a channel quality of a channel between the first station and the second station;
- in response to receiving the request message, send the channel information to the first station; and
- receive indication information, wherein the second station comprises a wake-up receiver and a main radio circuit, the indication information comprises content indicating a first operating channel of the wake-up receiver for listening for a wakeup packet or a first operating band of the wake-up receiver for listening for a wakeup packet, and the indication information is selected based on the channel information; and
a processor; and
a non-transitory computer-readable storage medium storing a program to be executed by the processor, the program including instructions for:
- in response to receiving the indication information, changing a currently-used operating channel of the wake-up receiver or a currently-used operating band of the wake-up receiver according to the content of the indication information, causing the wake-up receiver to listen on the indicated first operating channel or the indicated first operating band for a wakeup packet corresponding to the second station; and in response to receiving a wakeup packet corresponding to the second station on the currently-used operating channel of the wake-up receiver or the currently-used operating band of the wake-up receiver, causing the wake-up receiver to wake the main radio circuit up using a currently-used operating channel of the main radio circuit.

14. The second station according to claim 13, wherein the channel information comprises:
channel state information (CSI) of channels or bands that are selectable by the wake-up receiver;
a channel quality sequence of channels or bands that are selectable by the wake-up receiver; or
a number of the first operation channel or the first operating band.

15. The second station according to claim 13, wherein the transceiver is comprised in:
the wake-up receiver.

16. The second station according to claim 13, wherein the transceiver is comprised in:
the main radio circuit.

17. A second station, comprising:
a main radio circuit; and
a wake-up receiver;
wherein the main radio circuit is configured to:
receive indication information; and
send the indication information to the wake-up receiver, wherein the indication information indicates a first operating channel of the wake-up receiver for listening for a wakeup packet, a first operating band of the wake-up receiver for listening for a wakeup packet, or the first operating channel of the wake-up receiver for listening for a wakeup packet and the first operating band of the wake-up receiver for listening for a wakeup packet, and the indication information is generated based on channel information of a channel quality of a channel between the second station and a first station; and wherein the wake-up receiver is configured to:
obtain the indication information;
in response to obtaining the indication information, change a currently-used operating channel or a currently-used operating band for listening for a wakeup packet according to content of the indication information; and
in response to receiving a wakeup packet corresponding to the second station on the currently-used operating channel of the wake-up receiver or the currently-used operating band of the wake-up receiver, cause the wake-up receiver to wake the main radio circuit up.

18. The second station according to claim 17, wherein the indication information comprises:
a sequence number indicating the first operating channel of the wake-up receiver for listening for a wakeup packet, the first operating band of the wake-up receiver for listening for a wakeup packet, or the first operating channel of the wake-up receiver for listening for a wakeup packet and the first operating band of the wake-up receiver for listening for a wakeup packet; or
content instructing the main radio circuit to feed back a response message; or
content used to manage or control the main radio circuit.

19. The second station according to claim 17, wherein the wake-up receiver is further configured to send the channel information, and the channel information comprises:
a channel quality sequence of channels or bands that are selectable by the wake-up receiver.

20. The second station according to claim 17, wherein the main radio circuit is further configured to send the channel information, and the channel information comprises:
channel state information (CSI) of channels or bands that are selectable by the wake-up receiver;
a channel quality sequence of channels or bands that are selectable by the wake-up receiver; and
a number the first operating channel or the first operating band.

* * * * *